April 25, 1944.                H. M. MARTIN                2,347,208
                          TORQUE MEASURING DEVICE
                            Filed Jan. 2, 1943

Inventor:
Harold M. Martin,
by Harry E. Dunham
His Attorney.

Patented Apr. 25, 1944

2,347,208

UNITED STATES PATENT OFFICE 2,347,208

TORQUE MEASURING DEVICE

Harold M. Martin, Schenectady, N. Y., assignor to General Electric Company, a corporation of New York Application January 2, 1943, Serial No. 471,103

10 Claims. (Cl. 265—24)

My invention relates to improvements in torque measuring devices and more particularly to such devices arranged to measure the torque of coaxial rotating shafts.

An object of my invention is to provide an improved torque measuring device for measuring the torque of coaxial oppositely or similarly rotating shafts.

Another object of my invention is to provide an improved tandem dynamometer construction for measuring the separate and combined torques of a pair of dynamometers having coaxial shafts adapted to be driven in opposite or the same directions and to rotate together to act as a single dynamometer irrespective of the direction of rotation of the driving devices.

Further objects and advantages of my invention will become apparent and my invention will be better understood from the following description referring to the accompanying drawing, and the features of novelty which characterize my invention will be pointed out with particularity in the claims annexed to and forming part of this specification.

Certain types of drives include a plurality of substantially coaxial shafts adapted to rotate in the same or different directions, and in testing the driving devices, it is desirable to be able to determine the separate torques of the different drive shafts as well as the simultaneous combined torque of all of the shafts rotating in their respective directions. In order to measure these various torques, I provide a torque measuring device including a plurality of dynamometers having substantially coaxial shafts which are adapted to measure, separately or combined, the torques of a plurality of shafts rotating in the same or different directions.

Figure 1:
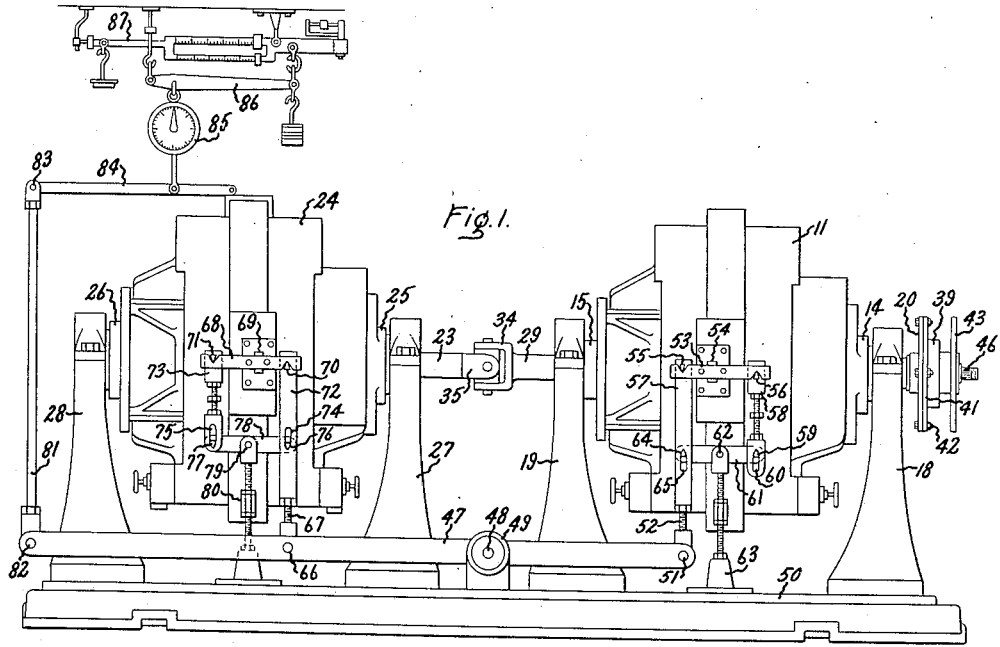
Figure 2:
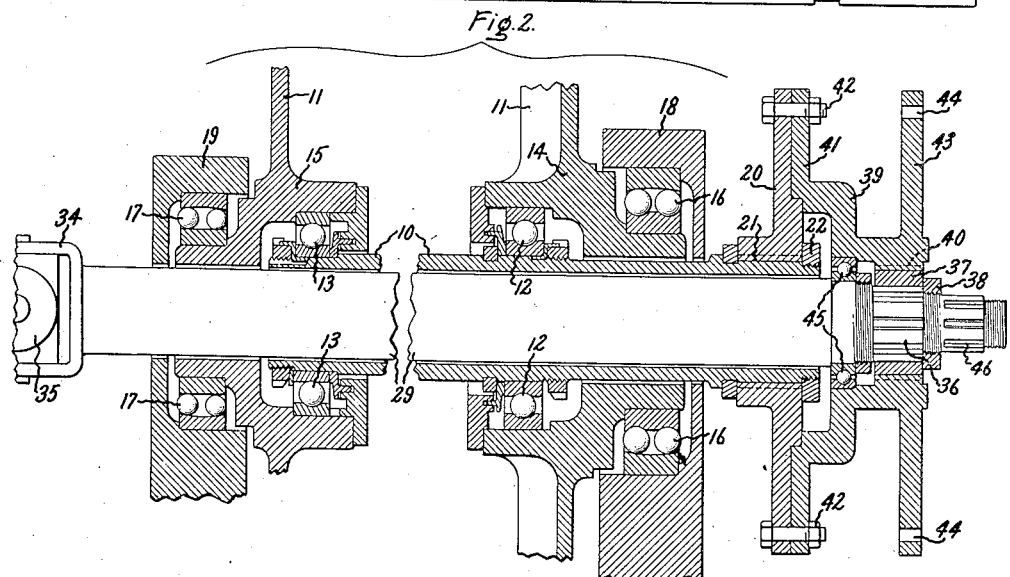
Figure 3:
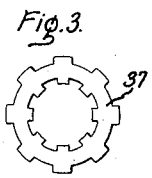

In the drawing, Fig. 1 is a side elevational view of a dynamometer set embodying my invention; Fig. 2 is an enlarged sectional view of the shafts and supporting bearings of the right-hand dynamometer shown in Fig. 1; and Fig. 3 is an end view of an internally and externally splined coupling ring element shown in Fig. 2.

Referring to the drawing, I have shown a torque measuring device including a pair of axially spaced apart dynamometers arranged in tandem relationship. Each dynamometer is constructed as a complete unit which may be used to measure torque independently. The right-hand dynamometer is provided with a rotatable member mounted on a hollow tubular sleeve or quill shaft 10 and is adapted to produce a torque reaction on a relatively rotatable torque reaction outer member 11. The quill shaft 10 is rotatably supported on the torque reaction member 11 by ball bearings 12 and 13 at each end thereof arranged in bearing housings formed by hubs 14 and 15, respectively, of the torque reaction member 11. This member 11 also is rotatably supported at each end thereof by ball bearings 16 and 17 which are arranged within bearing housings formed in pedestal supports 18 and 19, respectively. In order to provide a driving connection between the shaft 10 and a driving member, a coupling 20 is mounted on an end of the shaft 10 away from the other dynamometer and is rigidly secured thereon against relative rotational movement by a splined connection 21 and retained in position by a nut 22 which threadedly engages the end of the shaft 10. The other dynamometer is provided with a rotatable member mounted on a shaft 23 and adapted to be rotated in the same or opposite direction to the direction of rotation of the other rotatable member and to provide a torque reaction on a relatively rotatable torque reaction outer member 24. This rotatable member of the second dynamometer is rotatably supported in bearings in hubs 25 and 26 of the outer member 24 arranged adjacent each end thereof, and the second dynamometer torque reaction member 24 is supported in relatively rotatable relationship with respect to its rotatable member and shaft 23 by bearings arranged about the hubs 25 and 26 in pedestal supports 27 and 28. In order to provide for connection of the two shafts 10 and 23 to substantially coaxial driving members, these shafts are arranged in substantially coaxial relationship and a third shaft 29 is arranged substantially coaxially within the quill shaft 10 and projects from each end thereof. This shaft 29 is rotatably supported within the quill shaft 10 and in relatively rotatable relationship thereto by ball bearings 45 arranged within a bearing housing formed in the coupling member 39 attached to member 20 by the bolts 42 and by a coupling member 34 which is adapted to be supported by and connected to the shaft 23 by securing the coupling member 34 to a conventional universal and complementary coupling member 35 mounted on the shaft 23 and forming a universal joint and driving connection therewith. In order to provide an arrangement whereby the two dynamometers may be used as a single dynamometer to measure the torque of a relatively large source of power, the rotatable members of the two dynamometers are adapted to be mechanically connected together and coupled to the common source of power. In order to provide this connection, the auxiliary shaft 29 is formed with a splined end portion 36 adjacent the coupling 20 and an internally and externally splined coupling ring member 37 is fitted over the splined shaft portion 36 and retained in position thereon by a nut 38. A double flanged coupling 39 is provided with an internally splined portion 40 which is arranged in engagement with the externally splined portion of the coupling ring 37 to provide a rigid connection between the coupling 39 and the shaft 29. This coupling member 39 is provided with a flanged portion 41 which is adapted to be secured to the coupling 20 on the shaft 10 by a plurality of circumferentially spaced apart bolts 42 and is provided with a second flanged portion 43 provided with a plurality of openings 44 through which bolts are adapted to extend to couple or secure the flange 43 to a complementary coupling member connected to the drive shaft of a driving device which it is desired to test. In this manner, both of the rotatable members of the two dynamometers are securely connected together and are adapted to rotate in the same direction as a single machine. When it is desired to measure the torque of two coaxial shafts rotating in the same or in opposite directions, the splined coupling ring 37 is removed from engagement with the splined portion 36 of the shaft 29 and the splined portion 40 of the coupling 39, so as to disconnect mechanically the shafts 10 and 29 and thereby disconnect the rotatable members of the two dynamometers. With such an arrangement, the coupling 39 is adapted to be secured to one of the drive shafts and is rotatably supported by anti-friction bearings 45 on the end of the shaft 29 adjacent the splined portion 36 thereof. The shaft 29 is adapted to be coupled to a second independent drive shaft by any suitable coupling secured to this shaft by a splined connection to a second splined portion 46 formed on the end of the shaft 29 adjacent the splined portion 36. A coupling similar to the coupling 20 may be secured to the shaft 29 to provide a driving connection with the rotatable member of the second dynamometer. With this arrangement, the torque of two coaxial drive shafts running at substantially the same speed can be transmitted to the two dynamometers irrespective of their directions of rotation without interference of the operation of either of the dynamometers or drive shafts.

In order to measure the torque of the torque reaction members, a linkage is provided for connecting the torque reaction members to a force indicating device and includes a longitudinally extending dynamometer lever arm 47 pivotally mounted by a pivot pin 48 on a support 49 arranged longitudinally intermediate the two dynamometers and mounted on a base 50. One end of the dynamometer lever 47 is pivotally connected by a pivot pin 51 to an adjustable link member 52 of a reverse torque linkage mechanism which is arranged to transmit an upward force to the pin 51 for either direction of torque of the torque reaction member 11. This mechanism includes a bar 53 secured to the end of a torque arm 54 which is rigidly secured to the exterior of the dynamometer member 11. The ends of the bar 53 are provided with notches arranged to engage knife edges 55 and 56 secured to the upper ends of link members 57 and 58, respectively, of the reverse torque mechanism. If the torque on the torque reaction member 11 produces an upward force on the torque arm 54, the notch in the left end of the bar 53 will engage knife edge 55 and will exert an upward force on the link formed by the link members 57 and 52 which will transmit this upward force directly to the pin 51. If the torque on the torque reaction member 11 produces a downward force on the torque arm 54, the notch in the right end of the bar 53 will engage the knife edge 56 and will exert a downward force on the link 58, which will cause the lower end of the link 58 to engage a knife edge 59 arranged in a slot 60 in the link 58. The knife edge 59 is secured to the end of a force reversing and transmitting lever 61 which is pivotally supported at the center thereof by a pivot pin 62 on a stationary mounting 63 secured to the base 50 and is provided with a knife edge 64 in the other end thereof arranged in a slot 65 in the link member 57. The downward force on the knife edge 59 is transmitted as an upward force to the link member 57 by the knife edge 64 and a corresponding upward force is exerted on the pin 51 connected to the lever 47. The arrangement of the notches in the bar 53 and of the slots 60 and 65 provides for the free transmittal of forces in either direction without interference of the unused parts of the mechanism. Thus, the force transmitted to the pin 51 from the torque reaction member 11 is always in an upward direction and tends to rotate the dynamometer lever 47 in a counter-clockwise direction. The lever 47 also is secured by a pivot pin 66 to an adjustable link member 67 of another reverse torque mechanism connected to the torque reaction member 24. This reverse torque mechanism is similar to the mechanism associated with the dynamometer member 11 and includes a bar 68 rigidly secured to the member 24 by a torque arm 69 and is arranged to transmit a downward force to the pin 66 for either direction of torque on the member 24. The bar 68 is formed with notches in the ends thereof adapted to engage knife edges 70 and 71 secured to the upper ends of link members 72 and 73 of the reverse torque mechanism. Slots 74 and 75 are formed in the link member 72 and 73, respectively, and are arranged in engagement with knife edges 76 and 77 secured to a force reversing and transferring lever 78 which is pivotally mounted on a pivot pin 79. The pivot pin 79 is supported on a mounting bracket 80 mounted on a base 50. If the force on the torque arm 69 is in a downward direction, it is transmitted directly to the pivot pin 66 through the bar 68, the knife edge 70, and the link members 72 and 67; while if the force on the torque arm 69 is in an upward direction, it is transmitted to the pin 66 through the bar 68, the knife edge 71, the link member 73, and the knife edge 77 as an upward force to the force reversing lever 78, and from this lever as a downward force to the knife edge 76, and through the link members 72 and 67 to the pin 66. Thus, the force transferred to the pin 66 from the torque reaction member 24 is always in a downward direction and also tends to rotate the dynamometer lever 47 in a counter-clockwise direction. The pins 51 and 66 are arranged equal distances from the pivotal supporting pin 48 of the lever 47 so that their leverage about the pin 48 is equal. This linkage provides for a simple addition of the torques of the torque reaction members 11 and 24. The indication of this summation is obtained by connecting the dynamometer lever 47 to a suitable force measuring or indicating device through a link 81 which is pivotally secured to an end of the lever 47 by a pivot pin 82 and pivotally secured by a pivot pin 83 to a lever 84 connected to a spring scale 85 and a set of balance arms 86 and 87. The torque reaction of either of the dynamometers may be measured separately by disconnecting the dynamometer lever 47 from its connection to the torque reaction member which is not to be used. Thus, by disconnecting the link member 67 from the pivot pin 66 and removing the coupling ring 37 from the splined connection formed with the splined end 36 of the shaft 29 and the splined portion 40 of the coupling 43, the torque reaction of the torque reaction member 11 can be measured separately from that of the member 24, taking into account any slight static unbalance which may result and which is readily determinable by the reading of the scale 85 when the machine is not in operation. Similarly, by disconnecting the link member 52 from the pivot pin 51, the torque reaction of the torque reaction member 24 can be measured separately from the torque reaction of the member 11.

With this torque measuring device, measurement of the torque of a plurality of oppositely or similarly rotating driving members may be readily determined and torque of such driving members may be measured either separately or combined by the same device. Furthermore, the two torque measuring machines may be used as a single torque measuring device to measure a relatively large torque of a single driving member which may provide a torque greater than that which can be absorbed by either of the machines separately.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A torque measuring device including a pair of rotatable members and a pair of relatively rotatable torque reaction members adapted to cooperate with said rotatable members, means for rotatably supporting said torque reaction members, means including a quill shaft for rotatably supporting one of said rotatable members, means including another shaft for rotatably supporting the other of said rotatable members, means for connecting said quill shaft to a driving means, means extending substantially coaxially through said quill shaft for connecting said other shaft to a driving means, means for connecting together said shafts and for connecting said shafts to a common source of power, and means for measuring the combined torque reaction of all of said torque reaction members.

2. A torque measuring device including a pair of rotatable members and a pair of relatively rotatable torque reaction members adapted to cooperate with said rotatable members, means for rotatably supporting said torque reaction members, means including a quill shaft for rotatably supporting one of said rotatable members on one of said torque reaction members, means including another shaft for rotatably supporting the other of said rotatable members on the other of said torque reaction members, means for connecting said quill shaft to a driving means, means extending substantially coaxially through said quill shaft for connecting said other shaft to a driving means, means for connecting said shafts together and for connecting said shafts to a common source of power, and means for measuring the separate and combined torque reactions of said torque reaction members.

3. A torque measuring device including a pair of rotatable members and a pair of relatively rotatable torque reaction members adapted to cooperate with said rotatable members, means for rotatably supporting said torque reaction members, means including a quill shaft for rotatably supporting one of said rotatable members, means including another shaft for rotatably supporting the other of said rotatable members, means for connecting said quill shaft to a driving means, means including a third shaft extending substantially coaxially through said quill shaft and rotatably supported relatively thereto for connecting said other shaft to a driving means, means for connecting together said quill shaft and said third shaft for rotation together and for connecting said shafts to a driving device, and means for measuring the torque reaction of said torque reaction members.

4. A torque measuring device including a pair of axially spaced apart rotatable members and a corresponding pair of axially spaced apart relatively rotatable torque reaction members each adapted to cooperate with one of said rotatable members, means for rotatably supporting said torque reaction members in tandem relationship, means including a quill shaft for rotatably supporting one of said rotatable members, means including another shaft for rotatably supporting the other of said rotatable members, means for connecting said quill shaft to a driving means, means extending substantially coaxially through said quill shaft for connecting said other shaft to a driving means, and means for connecting together said quill shaft and said last-mentioned means for rotation together and for connecting said shafts to a driving device.

5. A torque measuring device including a pair of rotatable members and a corresponding pair of torque reaction members each adapted to cooperate with one of said rotatable members, means for rotatably supporting said torque reaction members, means including a shaft for rotatably supporting one of said rotatable members, means including another shaft for rotatably supporting the other of said rotatable members, means for connecting said first-mentioned shaft to a driving means, means including a coupling member for connecting together said first-mentioned shaft and said other shaft for rotation together and for also connecting said shafts to a driving device, a force measuring device, and a separate reverse torque linkage connected to each of said torque reaction members and to said force measuring device for biasing said force measuring device in the same direction for either direction of rotation of said rotatable members simultaneously and separately.

6. A torque measuring device including a pair of rotatable members and a corresponding pair of torque reaction members each adapted to cooperate with one of said rotatable members, means for rotatably supporting said torque reaction members, means including a shaft for rotatably supporting one of said rotatable members, means including another shaft for rotatably supporting the other of said rotatable members, means for connecting said first-mentioned shaft to a driving means, means extending substantially coaxially with said first-mentioned shaft for connecting said other shaft to a driving means, means including a coupling member for connecting together said first-mentioned shaft and said last-mentioned means for rotation together and for also connecting said shafts to a driving device, a force measuring device, and a separate reverse torque linkage connected to each of said torque reaction members and to said force measuring device for biasing said force measuring device in the same direction for either direction of rotation of said rotatable members simultaneously and separately.

7. A torque measuring device including a pair of rotatable members and a corresponding pair of torque reaction members each adapted to cooperate with one of said rotatable members, means for rotatably supporting said torque reaction members, means including a quill shaft for rotatably supporting one of said rotatable members, means including another shaft for rotatably supporting the other of said rotatable members, means for connecting said quill shaft to a driving means, means extending substantially coaxially through said quill shaft for connecting said other shaft to a driving means, means for connecting together said quill shaft and said last-mentioned means for rotation together and for connecting said shafts to a driving device, a force measuring device, and a separate reverse torque linkage connected to each of said torque reaction members and said force measuring device for biasing said force measuring device in the same direction for either direction of rotation of said rotatable members simultaneously and separately.

8. A torque measuring device including a pair of rotatable members and a corresponding pair of torque reaction members each adapted to cooperate with one of said rotatable members, means for rotatably supporting said torque reaction members, means including a quill shaft for rotatably supporting one of said rotatable members, means including another shaft for rotatably supporting the other of said rotatable members, means for connecting said quill shaft to a driving means, means extending substantially coaxially through said quill shaft for connecting said other shaft to a driving means, means for connecting together said quill shaft and said last-mentioned means for rotation together and for connecting said shafts to a driving device, and means including a linkage for measuring the torque reaction of said torque reaction members, said linkage including a longitudinally extending member, means for pivotally mounting said longitudinally extending member, means for connecting said longitudinally extending member to one of said torque reaction members on one side of said pivotal mounting, means for connecting said longitudinally extending member to the other of said torque reaction members on the other side of said pivotal mounting, a force indicating device, and means for connecting said longitudinally extending member to said force indicating device.

9. A torque measuring device including a pair of rotatable members and a pair of relatively rotatable torque reaction members each adapted to cooperate with one of said rotatable members, means for connecting said rotatable members to driving means for rotation of each of said rotatable members in an opposite direction, means including a linkage for measuring the torque reaction of said torque reaction members for rotation in either direction, said linkage including a longitudinally extending member, means for pivotally mounting said longitudinally extending member, reverse torque linkage means for connecting said longitudinally extending member to one of said torque reaction members on one side of said pivotal mounting for biasing said longitudinally extending member in only one direction for either direction of torque on said one torque reaction member, reverse torque linkage means for connecting said longitudinally extending member to the other of said torque reaction members on the other side of said pivotal mounting from said first-mentioned connection for biasing said longitudinally extending member in only the same direction about said pivotal mounting for either direction of torque on said other torque reaction member, a force indicating device, and means for connecting said longitudinally extending member to said force indicating device.

10. A torque measuring device including a pair of rotatable members and a pair of relatively rotatable torque reaction members each adapted to cooperate with one of said rotatable members, means for connecting said rotatable members to driving means, means including a coupling member for connecting together said rotatable members for rotation together and for also connecting said rotatable members to a driving device, means including a linkage for measuring the torque reaction of said torque reaction members for rotation in either direction, said linkage including a longitudinally extending member, means for pivotally mounting said longitudinally extending member, reverse torque linkage means for connecting said longitudinally extending member to one of said torque reaction members on one side of said pivotal mounting for biasing said longitudinally extending member in only one direction for either direction of torque on said one torque reaction member, reverse torque linkage means for connecting said longitudinally extending member to the other of said torque reaction members on the other side of said pivotal mounting from said first-mentioned connection for biasing said longitudinally extending member in only the same direction about said pivotal mounting for either direction of torque on said other torque reaction member, a force indicating device, and means for connecting said longitudinally extending member to said force indicating device.

HAROLD M. MARTIN.